US012598521B2

(12) United States Patent
    Polaganga

(10) Patent No.: US 12,598,521 B2
(45) Date of Patent: Apr. 7, 2026

(54) SYSTEMS AND METHODS FOR USER EQUIPMENT HANDOVER PREPARATION EFFICIENCY OPTIMIZATION

(71) Applicant: T-MOBILE INNOVATIONS LLC, Overland Park, KS (US)

(72) Inventor: Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 442 days.

(21) Appl. No.: 18/177,680

(22) Filed: Mar. 2, 2023

(65) Prior Publication Data

US 2024/0298226 A1     Sep. 5, 2024

(51) Int. Cl.
    *H04W 36/00*          (2009.01)
    *H04W 36/08*          (2009.01)

(52) U.S. Cl.
    CPC ...  *H04W 36/0079* (2018.08); *H04W 36/0077* (2013.01); *H04W 36/0085* (2018.08); *H04W 36/087* (2023.05)

(58) Field of Classification Search
    CPC ....... H04W 36/0061; H04W 36/00835; H04W 36/08
    See application file for complete search history.

(56) References Cited

U.S. PATENT DOCUMENTS

| | | | |
|---|---|---|---|
| 8,594,629 B2 | 11/2013 | Deng et al. | |
| 2009/0318155 A1* | 12/2009 | Fukuzawa ......... | H04W 36/0061 |
| | | | 455/438 |
| 2010/0167744 A1* | 7/2010 | Grob-Lipski ..... | H04W 36/0088 |
| | | | 455/436 |
| 2010/0323662 A1* | 12/2010 | Dahlen ................. | H04W 48/02 |
| | | | 455/410 |

(Continued)

FOREIGN PATENT DOCUMENTS

| | | | | |
|---|---|---|---|---|
| CN | 104853390 A | 8/2015 | | |
| KR | 101742552 B1 * | 5/2017 | ........ | H04W 36/0061 |

OTHER PUBLICATIONS

Translation of KR101742552B1 (Year: 2017).*

(Continued)

*Primary Examiner* — Barry W Taylor

(74) *Attorney, Agent, or Firm* — Shook, Hardy & Bacon L.L.P.

(57)          ABSTRACT

Systems and methods for user equipment handover preparation efficiency optimization are provided. In some embodiments, a base station may learn from prior UE handover operation attempts which neighboring base stations are operating in a barred access mode, and apply that information to subsequent handover operation attempts for other UE. In some embodiments, a handover preparation optimizer function maintains barred neighbor data that indicates when a UE handover operation attempt fails due to the target base station operating in a barred access mode. The source base station may then reference that barred neighbor data (Continued)

prior to sending subsequent handover request messages. In some embodiments, the handover preparation optimizer function may periodically refresh the barred neighbor data, for example by removing entries for target base stations listed in the barred neighbor data after a configurable period of time.

20 Claims, 7 Drawing Sheets

(56)                 References Cited

U.S. PATENT DOCUMENTS

2011/0032816 A1*   2/2011   Isaksson ............... H04W 76/19
                                                                        370/225
2014/0313907 A1*   10/2014   Wang .................... H04W 24/02
                                                                        370/242
2017/0070923 A1*   3/2017   Li ..................... H04W 28/0252

OTHER PUBLICATIONS

Unknown, "Report of [Pre117-e][012][IOT-NTN] Control Plane Open Issues," 3GPP TSG-RAN2 Meeting #117-e Online, Feb. 21-Mar. 3, 2022, R2-2203221, Agenda Item: 9.2.3, Source: Huawei, HiSilicon, Document for: Discussion and decision, 11 pages.
Unknown, "LTE; Evolved Universal Terrestrial Radio Access Network (E-UTRAN); S1 Application Protocol (S1AP) (3GPP TS 36.413 version 11.3.0 Release 11)," ETSI TS 136 413 V11.3.0, Apr. 2013, 278 pages.
Unknown, "LTE; Access Network (E-UTRAN); X2 Application Protocol (X2AP) (3GPP TS 36.423 version 11.2.0 Release 11)," ETSI TS 136 423 V11.2.0, Oct. 2012, 139 pages.

* cited by examiner

500

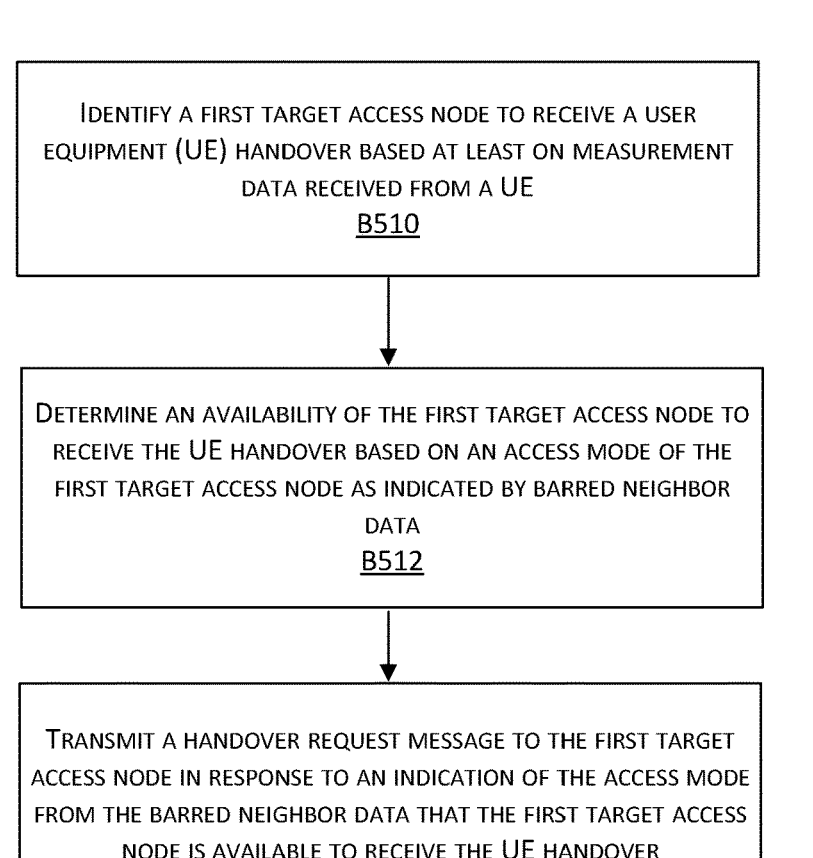

IDENTIFY A FIRST TARGET ACCESS NODE TO RECEIVE A USER
EQUIPMENT (UE) HANDOVER BASED AT LEAST ON MEASUREMENT
DATA RECEIVED FROM A UE
B510

DETERMINE AN AVAILABILITY OF THE FIRST TARGET ACCESS NODE TO
RECEIVE THE UE HANDOVER BASED ON AN ACCESS MODE OF THE
FIRST TARGET ACCESS NODE AS INDICATED BY BARRED NEIGHBOR
DATA
B512

TRANSMIT A HANDOVER REQUEST MESSAGE TO THE FIRST TARGET
ACCESS NODE IN RESPONSE TO AN INDICATION OF THE ACCESS MODE
FROM THE BARRED NEIGHBOR DATA THAT THE FIRST TARGET ACCESS
NODE IS AVAILABLE TO RECEIVE THE UE HANDOVER
B514

SYSTEMS AND METHODS FOR USER EQUIPMENT HANDOVER PREPARATION EFFICIENCY OPTIMIZATION

BACKGROUND

In cellular communications networks, a cell site base station (often referred to as a Radio Access Network (RAN)) can operate under various access modes. For example, a base station may operate under a locked cell access mode under which user equipment (UE) cannot access the base station because the base station has disabled transmission of downlink signals and is therefore not visible to UE. A base station may instead operate under a barred access mode under which the base station broadcasts its Physical Cell Identity (PCI), radiates radio frequency (RF) carrier signals in valid frequency bands, and otherwise appears to a UE as an available base station. However, a base station operating in a barred access mode will not allow a UE to camp on that cell site. Camping onto a cell site generally refers to the practice of a UE maintaining a connection with a base station in idle mode for the purpose of potentially moving to an active mode to establish an active communication session with the cellular communications network. For example, a UE will not be allowed to transition from idle mode to connected mode on a base station in a barred access mode. A base station may also instead operate under a reserved cell access mode under which the base station authorizes UE to camp based on their access class. For example, during an emergency a base station may switch from a standard active access mode where all UE subscribed to the cellular communications network are permitted to camp, to a reserved cell access mode where UE having an emergency responder access class (such as UE assigned to police, fire and/or rescue responders) are permitted access to the base station. Other UE not in a permitted access class for a cell site in reserved cell access mode will not be allowed to camp on that cell site. When a mobile UE attempts to perform a handover operation to transition from operation on a source base station to operation on a target base station, the success or failure of that handover operation attempt may depend, at least in part, on the access mode of the target base station.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments of the present disclosure provide for, among other things, solutions that address the problem of initiating handover preparations to a barred target base station. In contrast to existing technologies, one or more of the embodiments presented herein provide for base stations that may learn from prior UE handover operation attempts which neighboring base stations are operating in a barred access mode, and apply that information to subsequent handover operation attempts for other UE. A handover preparation optimizer function is disclosed that maintains information that records events when a UE handover operation attempt fails due to the target base station operating in a barred access mode. When a target base station operating in a barred access mode responds to a handover request from a source base station, the handover response message may comprise a rejection of the handover request that includes a reason code conveying to the source base station that the target base station operating in a barred access mode. A handover preparation optimizer function executing in the source base station may respond to the rejection by recording the target base station to barred neighbor data that is stored to a memory. The source base station may reference the barred neighbor data prior to sending subsequent handover request messages to avoid attempting UE handovers to barred base stations. In some embodiments, the handover preparation optimizer function may periodically refresh the barred neighbor data, for example by removing entries for target base stations listed in the barred neighbor data after a configurable period of time.

BRIEF DESCRIPTION OF THE DRAWINGS

Aspects of the present disclosure are described in detail herein with reference to the attached Figures, which are intended to be exemplary and non-limiting, wherein:

FIG. 5 is flow chart illustrating a method for handover preparation optimization, in accordance with some embodiments;

DETAILED DESCRIPTION

Figure 1:
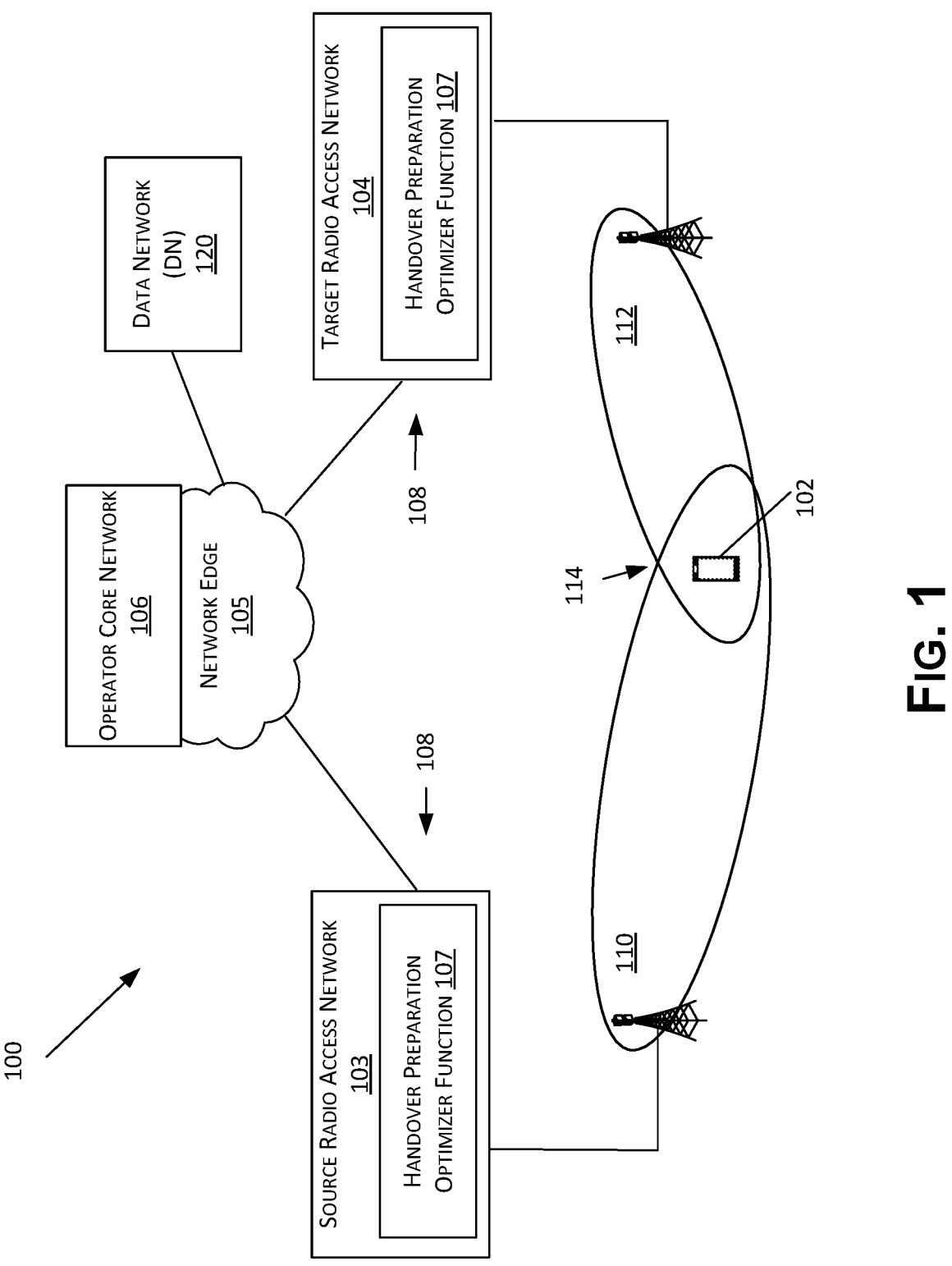
FIG. 1 is a diagrams illustrating an example network environment implementing handover preparation optimization, in accordance with some embodiments.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

With current cellular communications network technologies, user equipment (UE) handover operation attempts between a source base station and a target base station involve the exchange of multiple message (e.g., requests and responses) between the source base station and the target base station. Current practices are particularly inefficient with respect to handling UE handover operation attempts to a target base station that is operating in a barred access mode (which may be referred to as a "barred cell"). In such scenarios, each time a UE indicates that a barred target base station is a preferred priority candidate for handover, the source base station will initiate a handover request message to the target base station, and await the handover response message from the target base station. Although rejection of the handover request from the barred cell target base station is all but inevitable, with current cellular communications network technologies, receipt of that handover request rejection by the source base station is a prerequisite to trigger the source base station to move on to the next highest priority target base station indicated by the UE that actually may have the potential to accept the handover request. The inefficiencies of this process become more evident when multiple UE indicate to the source base station that the barred cell target base station is the preferred target base station for initiating a handover, since the source base station repeats the same process where it awaits the handover request rejection for each UE before sending a respective handover request to a target base station that is not in a barred access mode and can accept the handover request.

One or more of the embodiments of the present disclosure provide for, among other things, solutions that address the problem of initiating handover preparations to a barred target base station. In contrast to existing technologies, one or more of the embodiments presented herein provide for base stations that may learn from prior UE handover operation attempts which neighboring base stations may be operating in a barred access mode, and apply that information to subsequent handover operation attempts for other UE. More specifically, a handover preparation optimizer function is disclosed that may be implemented by a base station and/or other network node. The handover preparation optimizer function maintains information that records when a UE handover operation attempt fails due to the target base station operating in a barred access mode. With the embodiments disclosed herein, when a target base station operating in a barred access mode responds to a handover request from the source base station, the handover response message may comprise a rejection of the handover request (e.g., in the form of a "Handover Preparation Failure" message) that includes a reason code (or other indicator) conveying to the source base station that the target base station operating in a barred access mode. A handover preparation optimizer function executing on the source base station may respond to the rejection by recording, for example, an identification (ID) code for the target base station (e.g., a PCI) and a time of the rejection, as barred neighbor data that is stored to memory. The source base station may then reference that barred neighbor data prior to sending subsequent handover request messages. For example, when handover preparation for a UE is triggered, the handover preparation optimizer function may reference the barred neighbor data to determine if the preferred target base station is listed in the barred neighbor data. If so, the handover preparation optimizer function may cause the source base station to forgo initiating a handover request to that target base station, and instead send the handover request to a target base station that is ranked lower in preference but is not listed in the barred neighbor data. In some embodiments, the handover preparation optimizer function may periodically refresh the barred neighbor data, for example by removing entries for target base stations listed in the barred neighbor data after a configurable period of time. For example, after a given target base station has been listed in the barred neighbor data in excess of a duration of time specified by the network operator (e.g., 6 hours, 24 hours) the handover preparation optimizer function may remove that target base station from the barred neighbor data. If after the target base station is removed from the barred neighbor data, another UE handover is rejected by that target base station for reason of it being a barred cell, then the handover preparation optimizer function may again record that target base station to the barred neighbor data for the specified time duration. In some embodiments, when a base station that has been operating in a barred access mode is switch to an active access mode (e.g., an un-barred access mode), that base station may proactively notify one or more neighboring base stations that were recently sent handover rejections within a given time period, that their respective handover preparation optimizer function may remove the previously barred base station from the barred neighbor data.

With the embodiments presented herein, the end user benefits from an enhanced user experience by avoiding UE handover delays caused by ineffective handover preparation attempts to barred target base stations. Particularly with voice communications, handover delays can result in user perceivable discontinuities (e.g., user perceivable voice drops and/or gaps). Ineffective handover preparation attempts to barred target base stations also drain the resources of the base station (e.g., computing power, memory, channel bandwidth) that otherwise are used to support active UE communications links and processes. Moreover, handover preparation actions are performed, at least in part, over backhaul network channels between a source base station and a target base station (e.g., over the Xn interface). Ineffective handover preparation attempts to barred target base stations represent wasted consumption of the backhaul network resources since the requested handoff to a barred cell target base station is not a handoff that will be granted. The embodiments described herein substantially curtail such ineffective handover preparation attempts.

FIG. 1 is a diagram illustrating an example network environment 100 embodiment in which aspects of handover preparation optimization, may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises an operator core network 106 (also referred to as a "core network") that provides one or more wireless network services to one or more UE 102 within a coverage area of at least one base station 108. Such base stations are often individually referred to as a radio access network (RAN) 108. Each RAN 108 functions as an access node via which the UE 102 can wirelessly access services of the operator core network, such as telecommunications and data connectivity. In the context of fourth generation (4G) Longer Term Evolution (LTE), a RAN 108 may be referred to as an eNodeB, or eNB. In the context of fifth generation (5G) New Radio (NR), a RAN 108 may be referred to as a gNodeB, or gNB). Other terminology may also be used depending on the specific implementation technology. In this disclosure, a RAN 108 may also more generally be referred to as an access point. In some embodiments, network environment 100 comprises, at least in part, a wireless communications network.

In some embodiments, a RAN 108 may comprise in part components of a customer premises network, such as a distributed antenna system (DAS) for example. In some embodiments, a RAN 108 may comprise a multi-modal network (for example comprising one or more multi-modal access devices) where multiple radios supporting different systems are integrated into the radio or a RAN 108. Such a multi-modal RAN 108 may support a combination of 3GPP radio technologies (e.g., 4G, 5G and/or 6G) and/or non-3GPP radio technologies. In some embodiment, a RAN 108 may comprise a terrestrial wireless communications base station and/or may be at least in part implemented as a non-terrestrial space-based access network (e.g., comprising an Earth orbiting space-based wireless communications base station).

In particular, individual UE 102 may communicate with the operator core network 106 via a RAN 108 over one or both of uplink (UL) RF signals and downlink (DL) RF signals. The RAN 108 may be coupled to the operator core network 106 via a core network edge 105 that comprises wired and/or wireless network connections that may themselves include wireless relays and/or repeaters. In some embodiments, a RAN 108 is coupled to the operator core network 106 at least in part by a backhaul network such as the Internet or other public or private network infrastructure. The core network edge 105 may comprise one or more network nodes or other elements of the operator core network 106 that may define the boundary of the operator core network 106 and may serve as the architectural demarcation point where the operator core network 106 connects to other networks such as, but not limited to RAN 108, the Internet, or other third-party networks. It should be understood that in some aspects, the network environment 100 may not comprise a distinct network operator core network 106, but rather may implement one or more features of the network operator core network 106 within other portions of the network, or may not implement them at all, depending on various carrier preferences.

The network environment 100 is configured for wirelessly connecting UEs 102 to other UEs 102 via the same RAN 108, via other RAN 108, or via other telecommunication networks such as network 105 or a publicly-switched telecommunication network (PSTN), for example. The network environment 100 may be generally configured for wirelessly connecting a UE 102 to data or services that may be accessible on one or more application servers or other functions, nodes, or servers. The operating environment 100 may be generally configured, in some embodiments, for wirelessly connecting UE 102 to data or services that may be accessible on one or more application servers or other functions, nodes, or servers (such as services provided by servers of a data network 120).

UE 102 may in general, comprise forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 102 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 102 may include both mobile UE and stationary UE. The UE 102 can include one or more processors, and one or more non-transient computer-readable media for executing code to carry out the functions of the UE 102 described herein. The computer-readable media may include computer-readable instructions executable by the one or more processors. In some embodiments, the UE 102 may be implemented using a computing device 600 as discussed below with respect to FIG. 6.

As illustrated in FIG. 1, the RAN 108 of network environment 100 may include a first RAN 103 with a corresponding coverage area 110, and a second RAN 104 with corresponding coverage area 112. In some embodiments, the UE 102 is a mobile device that is connected to the first RAN 103 as its source RAN. As the UE 102 approaches an edge of the coverage area 110 of RAN 103, the UE 102 may sense (e.g., via decreasing RF signal power from RAN 103) that it is approaching the edge of coverage area 110 and therefore take one or more measurements of RF signals of neighboring base stations, such as RAN 104. Based on the measurements, the UE 102 may send a report of measurement data (e.g., a measurement report) to the RAN 103 with information about neighboring base stations available for a potential handover operation, including the second RAN 104. As shown in FIG. 1 at 114, the UE 102 may be located in a region where the coverage area 110 and the coverage area 112 overlap so that the RAN 104 may appear to UE 102 to be a potential preferred target RAN for a UE handover based on the measurement data. The measurement report may further include measurement data for one or more other neighboring base stations (RAN) available for a potential handover operation. In some embodiments, the UE 102 may obtain measurement data that includes RF channel quality measurements of RF signals of those neighboring base stations. Example quality measurements may include, but are not limited to, Reference Signal Received Power (RSRP), Reference Signal Received Quality (RSRQ), Received Signal Strength Indicator (RSSI), Synchronization Signal reference signal received power (SS-RSRP), Channel State Information reference signal received power (CSI-RSRP), and/or other signal quality measurements. In some embodiments, the measurement report may include identification information associated with those neighboring base stations. In some embodiments neighboring base stations having quality measurements that exceed a quality threshold and/or having quality measurements that exceed those of the source base station may be considered candidate target base stations. For example, the measurement report may include absolute radio-frequency channel number (ARFCN), E-UTRA Absolute Radio Frequency Channel Number (EARFCN), and/or Physical Cell ID (PCI) information of the candidate target base stations. The measurement report may rank the candidate target base stations in order of preference (e.g., based on the channel quality measurements).

Based on the measurement report, the RAN 103 may determine that RAN 104 has the most suitable (e.g., the highest quality) signal quality measurements to perform a UE handover of the UE 102. As discussed above, the RAN 103 and RAN 104 may each comprise wireless communication system base stations that each include an instance of a handover preparation optimizer function 107. Prior to the RAN 103 sending a UE handover request to the RAN 104, the handover preparation optimizer function 107 of the RAN 103 may check the barred neighbor data to determine if the proposed target RAN 104 is indicated as currently operating in a barred access mode. If RAN 104 is barred, the RAN 103 proceeds to consider the next priority candidate target RAN indicated by the quality measurements and the handover preparation optimizer function 107 again checks the barred neighbor data to determine if that next priority target RAN is indicated as a barred cell in the barred neighbor data.

When the barred neighbor data does not indicate that the RAN 104 is operating in a barred access mode, the source RAN 103 may then send a handover request message to initiate handover preparations with the RAN 104 designated as the target RAN to receive a UE handover of the UE 102. If the RAN 104 accepts the handover request, it may respond to RAN 103 with a handover response message that indicates the acceptance. The RAN 103 may then initiate the handover of UE 102 to the RAN 104 by sending the UE 102 a message comprising a radio resource control (RRC) reconfiguration and/or handover command.

If instead the RAN 104 does not accept the handover request because it is operating in a barred access mode, it may respond to RAN 103 with a handover response message that indicates a rejection for that reason. For example, the handover response message may comprise a Handover Preparation Failure message that includes a reason code or other indicator conveying to the source RAN 103 that RAN 104 is operating in a barred access mode. Based on the reason code, the handover preparation optimizer function 107 of the source RAN 103 may update the barred neighbor data to indicate that the RAN 104 is operating in a barred access mode, and may further include an indication of the time the RAN 104 was added to the barred neighbor data. Because the RAN 104 is now know to be a barred cell, the source RAN 103 may proceed to consider the next priority candidate target RAN indicated by the quality measurements and the handover preparation optimizer function 107 again checks the barred neighbor data to determine if that next priority target RAN is indicated as a barred cell in the barred neighbor data. This process may be repeated until the source RAN 103 successfully receives confirmation that a target RAN can receive a UE handover of the UE 102.

Figure 2:
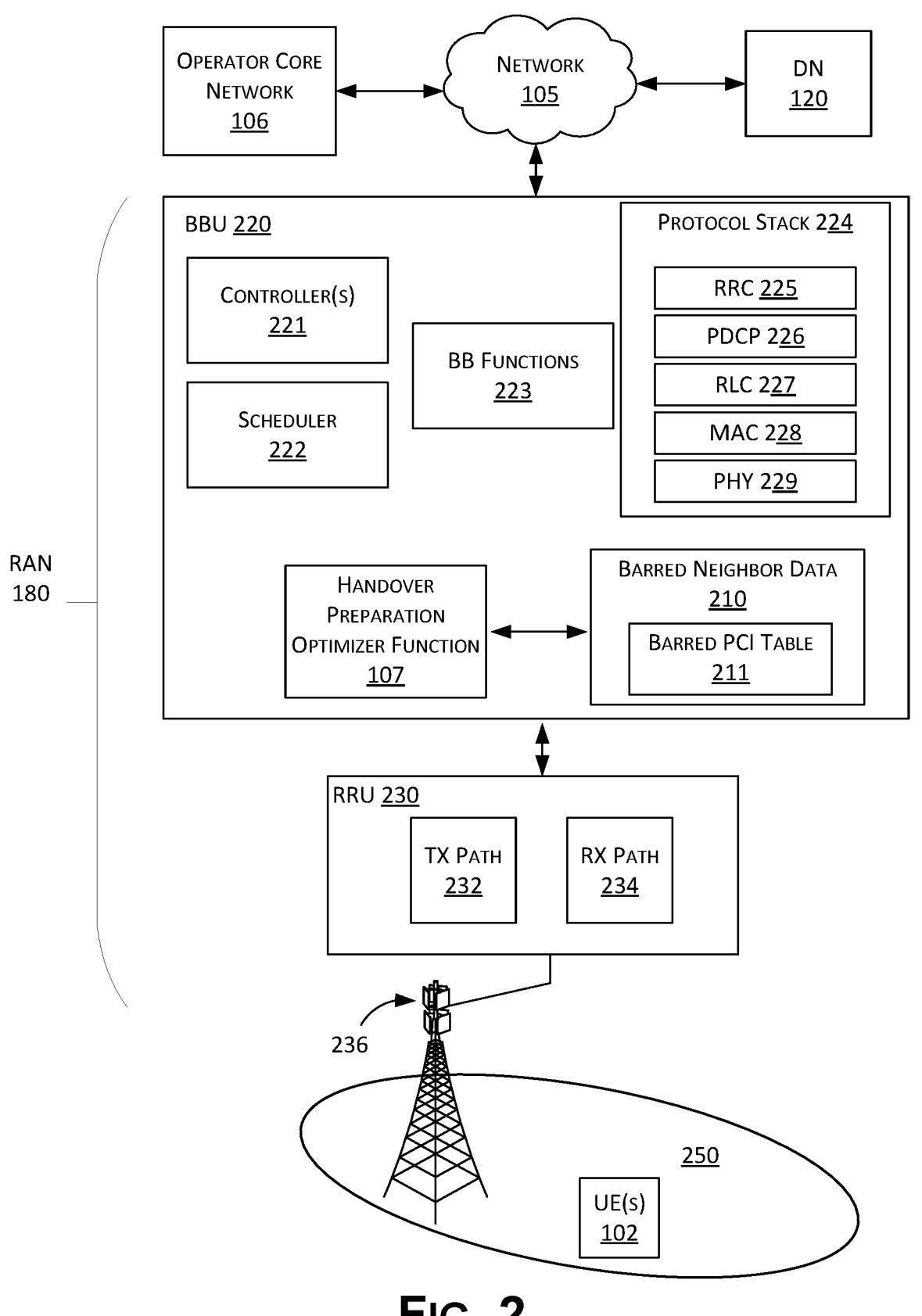
FIG. 2 is diagram illustrating an example of a radio access network for implementing handover preparation optimization, in accordance with some embodiments.

Referring now to FIG. 2, FIG. 2 illustrates a RAN 108, which may be used to implement a source RAN 103 and/or a target RAN 104 as illustrated in FIG. 1. The RAN 108 may comprise a baseband unit (BBU) 220 coupled to a least one Remote Radio Unit (RRU) 230 through which the base station 108 serves one or more UE 102 within a coverage area 250. In some embodiments, the BBU 220 may comprise the Central Unit (CU) of an open-RAN (ORAN) architecture base station. The BBU 220 may comprise the circuitry and functionality to implement an air interface and Open System Interconnection (OSI) Layer 1, Layer 2 and Layer 3 functions for the air interface. The RRU 230 includes a radio head comprising transmit (TX) path 232 that includes radio transmitter circuitry (such digital-to-analog converters, one or more RF filters, frequency up-converters, and/or a Power Amplifier (PA)) and receive path (RX) 234 that includes radio receiver circuitry (such analog-to-digital converters, one or more RF filters, frequency down converters, and/or a Low Noise Amplifier (LNA).) The TX path 232 and RX path 234 may be coupled to one or more antennas 236 by an appropriate coupler (such as a duplexer, for example). The antennas 236 may be physically mounted to a site tower or other structure (such as a building, for example). Downlink RF signals are radiated into coverage area 250 via TX path 232 and antenna(s) 236 for reception by the UE(s) 102. Uplink RF signals transmitted by the UE(s) 102 are received via the antenna(s) 236 and RX path 234. The RAN 108 may communicate with the UE(s) 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the RAN 108 may optionally support multiple air interfaces and/or multiple wireless operators.

As depicted in FIG. 2, the BBU 220 may comprise one or more controllers 221 comprising a processor coupled to a memory and programed to perform one or more of the functions of the RAN 108 described herein. The handover preparation optimizer function 107 is an example of a function of a RAN 108 that may be executed by the one or more controllers 221. In some embodiments, one or more of the base station functions described herein may be executed by one or more controllers in a distributed manner utilizing one or more network functions orchestrated or otherwise configured to execute utilizing processors and memory of the one or more controllers. For example, where RAN 108 comprises a gNodeB, the functions of the BBU 220 may be distributed between functional units comprising a Centralized Unit (CU) and at least one Distributed Unit (DU). As such, one or more functions of the base station described herein may be implemented by discrete physical devices or via virtual network functions.

The BBU 220 is responsible for, among other things, digital baseband signal processing, for example to process uplink and downlink baseband signals, shown in FIG. 2 as Baseband (BB) function(s) 223. The BBU 220 further includes a scheduler 222 through which the BBU 220 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 222 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink and downlink communications traffic between the BBU 220 and UE 102 are processed through a protocol stack 224 implemented by the BBU 220 that comprises various protocol stack layers. In the example embodiment illustrated in FIG. 2, the protocol stack 224 includes a radio resource control (RRC) layer 225, packet data convergence protocol (PDCP) layer 226, radio link control (RLC) layer 227, medium access control (MAC) layer 228, and physical layer (PHY) 129. The MAC layer 228 is responsible, for example, for mapping between logical channels of the RLC layer 227 and transport channels of the PHY layer 229. MAC layer 228 may also perform functions such as, but not limited to, multiplexing of MAC service data units (SDUs) from logical channels onto transport blocks (TB) to be delivered to the PHY layer 229 on transport channels, de-multiplexing of MAC SDUs from one or different logical channels from transport blocks (TB) delivered from the PHY layer 229 on transport channels, scheduling information reporting, error correction through hybrid automatic repeat requests (HARQ), priority handling between UEs by means of dynamic scheduling, priority handling between logical channels of one UE, and logical channel prioritization.

As already mentioned above, in some embodiments the BBU 220 implements the handover preparation optimizer function 107. The handover preparation optimizer function 107 works in conjunction with other operations executed by the BBU 220 to execute handover operations to facilitate the outgoing handover UE(s) 102 to other RAN, and the incoming handover of UE(s) that are entering coverage area 250. As shown in FIG. 2, the BBU 220 may include barred neighbor data 210 that is used by the handover preparation optimizer function 107 when preparing for outgoing handover functions. The barred neighbor data 210 may be stored in a local memory of the RAN 108. The handover preparation optimizer function 107 may reference barred neighbor data 210 when handover preparation for a UE 102 is triggered to determine if the UE's preferred target base station is listed in the barred neighbor data 210. If the UE's preferred target base station is listed in the barred neighbor data 210, the handover preparation optimizer function 107 may cause the RAN 108 to forgo initiating a handover request to that target base station, and instead send the handover request to a target base station that is ranked lower in preference and not otherwise listed in the barred neighbor data 210. In some embodiments, barred neighbor data 210 comprises a barred PCI table 211 that identifies previously identified barred target base stations based on their Physical Cell Identity (PCI). The barred neighbor data 210 and/or barred PCI table 211 may further include an indication of how long each barred target base station has been included in the barred neighbor data 210 (e.g., a timestamp). In some embodiments, the handover preparation optimizer function 107 may periodically refresh the barred neighbor data 210, for example, by removing target base stations from the barred neighbor data 210 (e.g., by either purging their PCI or otherwise updating a barred cell indicator) that have remained in the barred neighbor data 210 for longer than a configurable duration of time (e.g., based on the timestamp).

In some embodiments, the handover preparation optimizer function 107 may also function to optimize the operation of another RAN when the RAN 108 is operating in a barred access mode and a UE indicates that RAN 108 is a preferred target RAN. That is, in some embodiments, when the RAN 108 is operating in a barred access mode, it may receive an incoming handover request message as a target RAN for a UE currently served by another source RAN. In such an instance, the handover preparation optimizer function 107 may trigger a handover response message that includes a rejection of the handover request (e.g., in the form of a "Handover Preparation Failure" message) that includes a reason code conveying to the source RAN that RAN 108 is operating in a barred access mode. The handover preparation optimizer function instance implemented on that other RAN may then proceed to operate its instance of barred neighbor data to indicate that RAN 108 is a barred cell.

Figure 3:
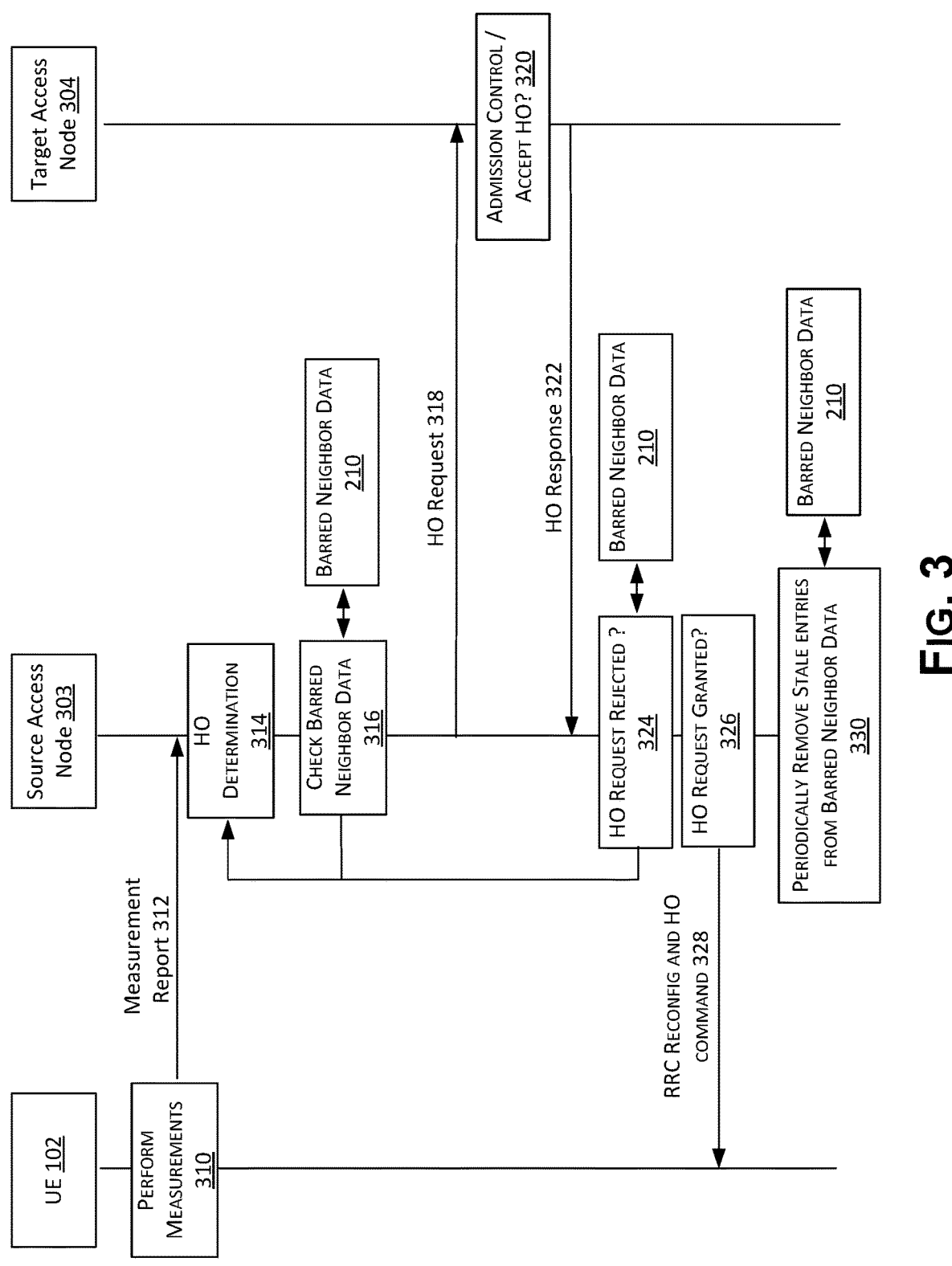
FIG. 3 is a data flow diagram illustrating interactions between a UE, a source access node, and a target access node, to implement handover preparation optimization in accordance with some embodiments.

Referring now to FIG. 3, FIG. 3 is data flow diagram illustrating interactions between a UE 102, a source access node 303 (such as the source base station/RAN 103 of FIG. 1) and a target access node 304 (such as the target base station/RAN 104 of FIG. 1), to implement handover preparation optimization according to an example embodiment. As illustrated in FIG. 3, a UE 102 may sense (e.g., via decreasing RF signal power from source access node 303) that it is approaching the edge of a coverage area of the source access node 303 to which it is connected.

The UE 102 performs one or more measurements of RF signals from neighboring base stations (shown at 310) and produces measurement data that may be sent as a measurement report to the source access node 303. The measurement data may include information about neighboring base stations available for a potential UE handover operation. For example, the UE 102 may obtain channel quality measurements of RF signals of neighboring base stations. Example quality measurements may include, but are not limited to Reference Signal Received Power (RSRP), Reference Signal Received Quality (RSRQ), Received Signal Strength Indicator (RSSI), Synchronization Signal reference signal received power (SS-RSRP), Channel State Information reference signal received power (CSI-RSRP), and/or other signal quality measurements. The UE 102 may compile the measurement data into a measurement report 312 that includes identification information (e.g., such as the PCI) of neighboring radio access nodes stations that are candidate target access nodes (e.g., based on those candidate target access nodes having quality measurements that exceed a quality threshold and/or having quality measurements that exceed those of the source access node 303). For example, the measurement report may include absolute radio-frequency channel number (ARFCN), E-UTRA Absolute Radio Frequency Channel Number (EARFCN), and/or Physical Cell ID (PCI) information of the candidate target access nodes. The measurement report 312 may rank the candidate target access nodes in order of preference (e.g., based on the channel quality measurements). The UE 102 sends the measurement report 312 to the source access node 303, and based on the measurement report, the source access node 303 select a candidate target operating node (shown in FIG. 3 as handover (HO) determination 314). For example, the source access node 303 may make a handover determination to initiate preparations to handover the UE 102 to target access node 304 based on target access node 304 being a preferred priority candidate target access node as indicated by quality measurements provided by the measurement report 312. As shown at 316, the handover preparation optimizer function 107 of the source access node 303 may check the barred neighbor data 210 to determine if the target access node 304 is indicated as a barred cell. If it is a barred cell, the source access node 303 may return to 314 and proceeds to determine the next preferred priority candidate target access node indicated by the quality measurements of the measurement report 312, and handover preparation optimizer function 107 checks the barred neighbor data 210 (at 316) to determine if that next highest priority target access node 304 is indicated as a barred cell in the barred neighbor data 210. These tasks at 314 and 316 may continue until a candidate target access node indicated by the measurement report 312 is identified that is not indicated as a barred cell by the barred neighbor data 210.

When a target access node 304 is identified that is not indicates by the barred neighbor data 210 as a barred cell, the source access node 303 then proceeds to transmit a handover request message 318 on behalf of the UE 102 to the identified target access node 304. An admission control process 320 at the target access node 304 may evaluate the handover request message 318 and determine whether to accept or reject the handover request. The target access node 304 may then transmit a handover response message 322 back to the source access node 303. In some embodiments, the handover request message 318 and/or the handover response message 322 may be communicated via an Xn interface channel through the network 105. The source access node 303 may evaluate the handover response message 322 to determine the response of the target access node 304 to the handover request message 318. If the handover response message 322 comprises a rejection of the handover request (e.g. a handover preparation failure) as shown at 324, the handover preparation optimizer function 107 may determine if the handover response message 322 includes a reason code or other indicator of a reason for rejection. Example reasons for the target access node 304 not accepting the handover request may include, but are not limited to, incompatibility issues between the UE 102 and the target access node 304 such as configuration issues, handover parameter misalignments, licensed feature mismatch, internet protocol (IP) address mismatch, or others.

The target access node 304 may also reject a handover request if the target access node 304 is operating in a barred access mode. When a handover response message 322 indicates that the target access node 304 has rejected the handover request, then the source access node 303 may return to 314 to select another priority candidate target access node based on the quality measurements of the measurement report 312. Moreover, the handover preparation optimizer function 107 may evaluate a reason code in the handover response message 322 to determine if the handover request was rejected because target access node 304 is operating in a barred access mode. If so, then the handover preparation optimizer function 107 may further update the barred neighborhood data 210 to indicate that the target access node 304 is a barred cell, and may further include a timestamp or start a counter that indicates how long the target access node 304 has been included in the barred neighborhood data 210.

If instead the handover response message 322 indicates that the target access node 304 accepts the request receive a UE handover of the UE 102 (shown at 326), the source access node 303 may initiate a standard handover process to transfer the UE 102 to the target access node 304. For example, the source access node 303 may communicate a RRC reconfiguration and handover command (as shown at 328) to initiate the handover of UE 102 to the target access node 304.

In some embodiments, the handover preparation optimizer function 107 of the source access node 303 may periodically refresh the barred neighbor data 210 by removing stale entries from the barred neighbor data 210 (as shown at 330). For example, the handover preparation optimizer function 107 may removing target access nodes from the barred neighbor data 210 that have remained in the barred neighbor data 210 for longer than a configurable duration of time. As such, those target access node removed from the barred neighbor data become available again to receive handover request messages. If a target access node removed from the barred neighbor data subsequently rejects a handover request because it is operating in a barred access mode, the handover preparation optimizer function 107 may again add that target access node to the barred neighbor data as discussed above.

Figure 4:
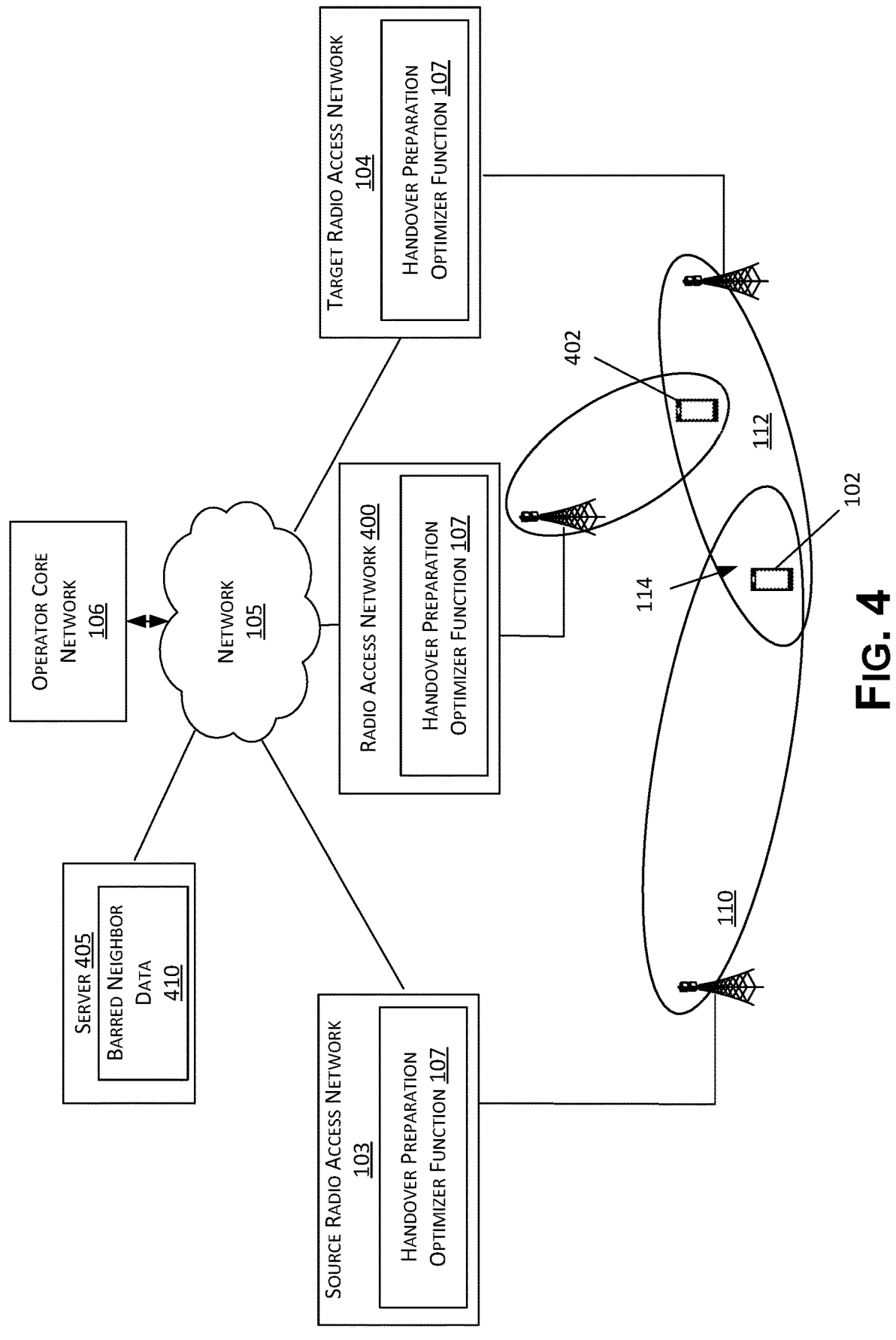
FIG. 4 is diagram illustrating another example network environment implementing handover preparation optimization, in accordance with some embodiments.

Referring now to FIG. 4, FIG. 4 illustrates an alternative implementation of the example network environment 100 embodiment of FIG. 1. In this implementation, the handover preparation optimizer function 107 of the source RAN 103 may learn that target RAN 104 is operating in a barred access mode based on prior interactions between a third RAN 400 and the target RAN 104. That is, the third RAN 400 may comprise a handover preparation optimizer function 107 that functions as described herein. RAN 400 may send a handover request message to handover a UE 402 to target RAN 104, and that request is rejected because target RAN 104 is operating in a barred access mode. In this embodiment, the handover preparation optimizer function 107 of RAN 400 may add the target RAN 104 to barred neighbor data 410 on a network server 405 based on the reason for rejection received from the target RAN 104, instead of, or in addition to, adding the target RAN 104 to the barred neighbor data 210 in the local memory of RAN 400. The handover preparation optimizer function 107 of the source RAN 103 may then read the barred neighbor data 410 from the network server 405 and avoid a UE handover delay caused by an ineffective handover preparation attempt to the target RAN 104, based on the information stored to the barred neighbor data 410. In some embodiments, the handover preparation optimizer function 107 of RAN 400 may be responsible for removing the indication of target RAN 104 from the barred neighbor data 410 after a specified time duration, as discussed above.

FIG. 5 is a flow chart illustrating a method 500 for handover preparation optimization according to an embodiment. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 may be implemented utilizing a handover preparation optimizer function 107 executing on a base station BBU, and/or a separate network node or server as discussed herein.

Method 500 at block B510 includes identifying a first target access node to receive a user equipment (UE) handover based at least on measurement data received from a UE. In some embodiments, the UE may obtain measurement data that includes RF channel quality measurements of RF signals of those neighboring base stations. Based on the measurement report, a source access node (e.g., a source RAN) may determine a candidate target access node that has the most suitable signal quality measurements to perform a UE handover of the UE. In some embodiments, a source node performing the method and/or the first target access node may comprise a wireless communication base station is configured to communicate with one or more UE over one or both of uplink (UL) radio frequency (RF) signals and downlink (DL) RF signals.

Method 500 at block B512 includes determining an availability of the first target access node to receive the UE handover based on an access mode of the first target access node as indicated by barred neighbor data. The barred neighbor data may include an access node identification of the first target access node to indicate when the first target access node is not available to receive the UE handover. A lack of an access mode appearing in the barred neighbor data for the first target access node, in some embodiments, may serve as an indication that the first target access node may be available to receive the UE handover.

Method 500 at block B514 includes transmitting a handover request message to the first target access node in response to an indication of the access mode from the barred neighbor data that the first target access node is available to receive the UE handover. In some embodiments, the method may include receiving a handover response message from the first target access node in response to the handover request message. The barred neighbor data may be updated based on an indication from the handover response message that the first target access node is in a barred access mode and not available to receive the UE handover. The method may then further update the barred neighbor data to include an indication of time that the barred neighbor data was updated to include the first target access node as a barred access mode. In order to maintain a freshness of the barred neighbor data, the method may proceed to remove the first target base station from the barred neighbor data based on an indication that the barred neighbor data has included the first target access node for longer than a specified time duration. In some embodiments, the method may transmit a message to the UE to initiate the UE handover based on an indication from the handover response message that the first target access node is available to receive the UE handover.

Figure 6:
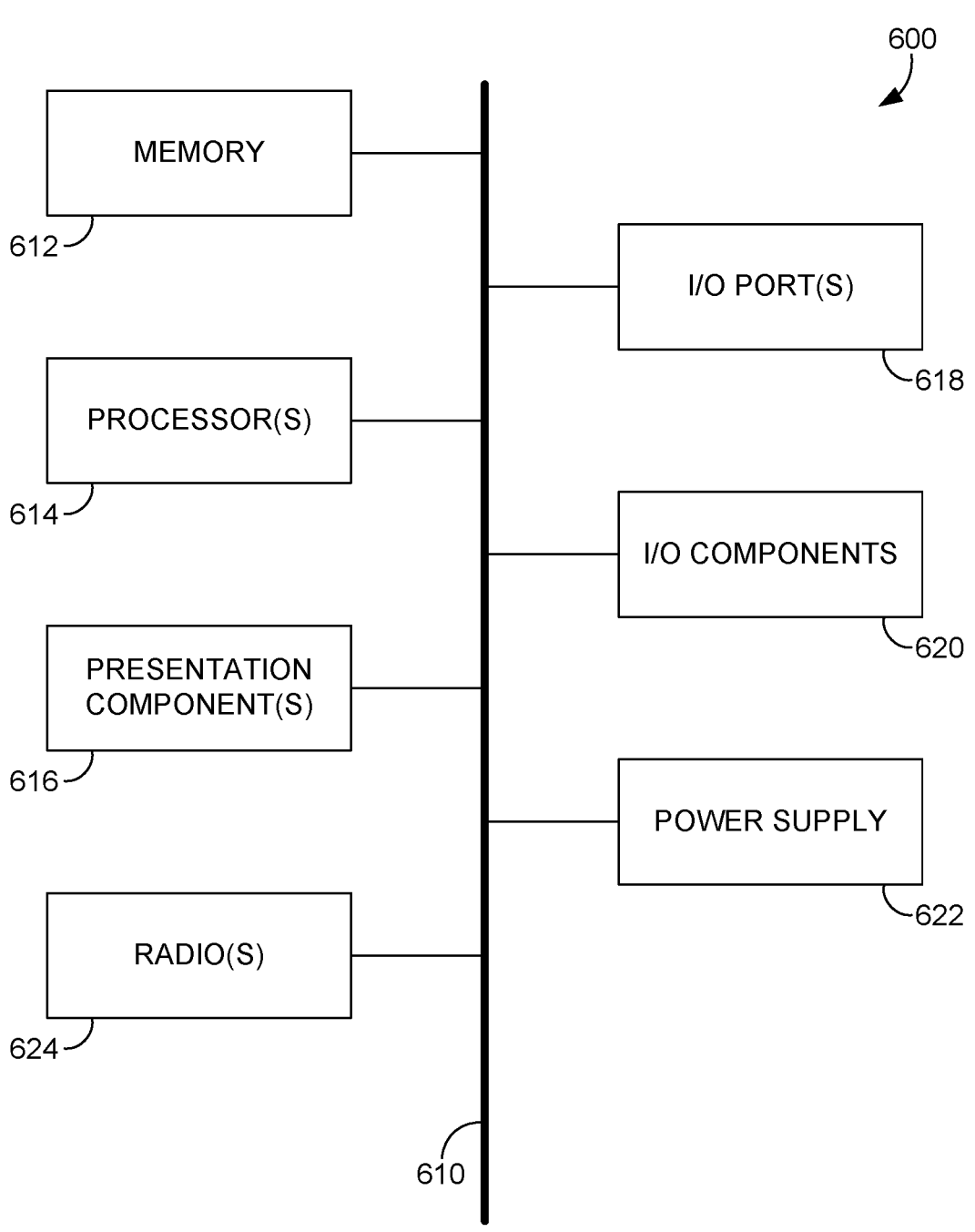
FIG. 6 is diagram illustrating an example computing environment according to an embodiment.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples the following devices: memory 612, one or more processors 614, one or more presentation components 616, input/output (I/O) ports 618, I/O components 620, power supply 622, and radio 624. Bus 610 represents what may be one or more busses (such as an address bus, data bus, or combination thereof). The devices of FIG. 6 are shown with lines for the sake of clarity. However, it should be understood that the functions performed by one or more components of the computing device 600 may be combined or distributed amongst the various components. For example, a presentation component such as a display device may be one of I/O components 620. In some embodiments, a base station, RAN and/or access node implementing a handover preparation optimizer function 107 may comprise a computing device 600 as discussed with respect to FIG. 6. In some embodiments, a UE, such as UE 102, may comprise a computing device such as computing device 600. The processors of computing device 600, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device." In some embodiments, one or more aspects of handover preparation optimizer function 107 may be implemented at least in part by code executed by the one or more processors(s) 614 using memory 612. In some embodiments, the barred neighbor data 210 may be stored in memory 612 of the computing device 600 executing the handover preparation optimizer function 107.

Computing device 600 typically includes a variety of computer-readable media. Computer-readable media can be any available non-transient media that can be accessed by computing device 600 and includes both volatile and non-volatile media, removable and non-removable media. By way of example, and not limitation, computer-readable media may comprise computer storage media and communication media. Computer storage media includes both volatile and nonvolatile, removable and non-removable non-transient media implemented in any method or technology for storage of information such as computer-readable instructions, data structures, program modules or other data.

Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. Memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 presents data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, joystick, game pad, satellite dish, scanner, printer, wireless device, etc.

Radio(s) 624 represents a radio that facilitates communication with a wireless telecommunications network. For example, radio(s) 624 may be used to establish communications with UE 102 and/or network 105. Illustrative wireless telecommunications technologies include CDMA, GPRS, TDMA, GSM, 4G LTE, 3GPP 5G, and other 3GPP technologies. In some embodiments, the radio(s) 624 comprise circuits that implement a radio module of a UE 102, and/or a RAN 108, as described herein. Radio(s) 624 may additionally or alternatively facilitate other types of non-3GPP wireless communications including Wi-Fi, WiMAX, and/or other VoIP communications. In some embodiments, radio(s) 624 may support multi-modal connections that include a combination of 3GPP radio technologies (e.g., 4G, 5G and/or 6G) and/or non-3GPP radio technologies. As can be appreciated, in various embodiments, radio(s) 624 can be configured to support multiple technologies and/or multiple radios can be utilized to support multiple technologies. In some embodiments, the radio(s) 624 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 7:
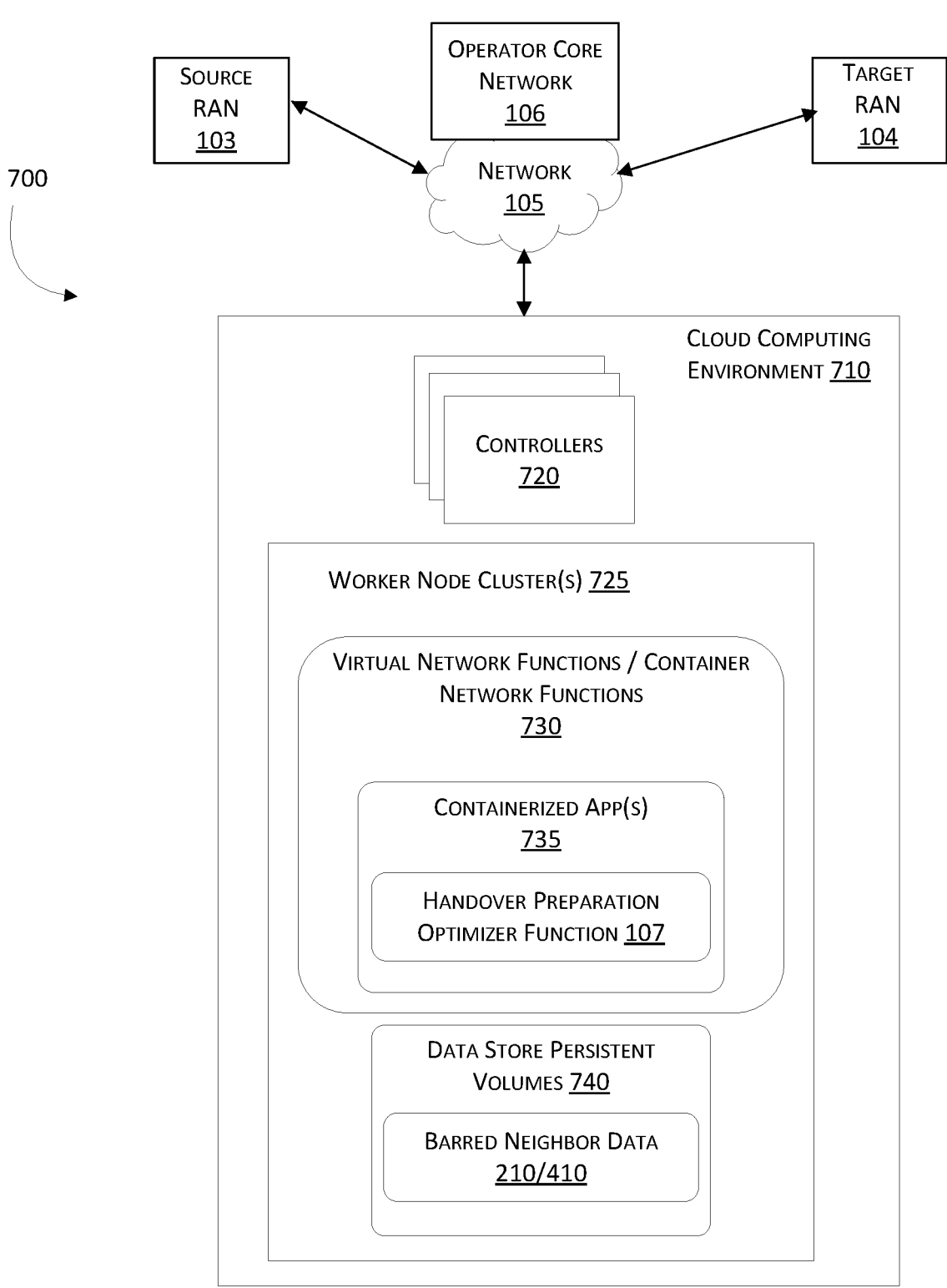
FIG. 7 is diagram illustrating an example cloud computing environment according to an embodiment.

Referring to FIG. 7, a diagram is depicted generally at 700 of an exemplary cloud computing environment 710 for implementing one or more aspects of mobility edge services, such as for handover preparation optimization as described herein. Cloud computing environment 710 is but one example of a suitable cloud-computing environment and is not intended to suggest any limitation as to the scope of use or functionality of the embodiments presented herein. Neither should cloud-computing environment 710 be interpreted as having any dependency or requirement relating to any one or combination of components illustrated. In some embodiments, the cloud-computing environment 710 is executed within operator core network 106, the core network edge 105, or otherwise coupled to the core network edge 105 or operator core network 106.

Cloud computing environment 710 includes one or more controllers 720 comprising one or more processors and memory. The cloud computing environment 710 may include one or more data store persistent volumes 740. The controllers 720 may comprise servers of one or more data centers. In some embodiments, the controllers 720 are programmed to execute code to implement at least one or more aspects of the handover preparation optimizer function 107. For example, in one embodiment the handover preparation optimizer function 107 may be implemented, at least in part, as one or more virtual network functions (VNFs)/container network functions (CNFs) 730 running on a worker node cluster 725 established by the controllers 720. In some embodiments barred neighbor data may be stored using the one or more data store persistent volumes 740. The cluster of worker nodes 725 may include one or more orchestrated Kubernetes (K8s) pods that realize one or more containerized applications 735 for the handover preparation optimizer function 107. In other embodiments, another orchestration system may be used to realize the handover preparation optimizer function 107. For example the worker nodes 725 may use lightweight Kubernetes (K3s) pods, Docker Swarm instances, and/or other orchestration tools. In some embodiments, one or more elements of the RAN 103 and/or RAN 104 may be coupled to the controllers 720 of the cloud-computing environment 710 and/or the operator core network 106 via core network edge 105.

In various alternative embodiments, system and/or device elements, method steps, or example implementations described throughout this disclosure (such as the UE, access networks, core network edge, operator core network, RAN, base stations, access nodes, handover preparation optimizer function, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for handover preparation optimization, the system comprising:

one or more processors; and one or more computer-readable media storing computer-usable instructions that, when executed by the one or more processors, cause the one or more processors to:

identify a first target access node to receive a user equipment (UE) handover based at least on measurement data received from a UE;

determine an availability of the first target access node to receive the UE handover based on an access mode of the first target access node as indicated by barred neighbor data, wherein the barred neighbor data indicates the access mode of one or more access nodes as compiled based on received handover response messages from the first target access node comprising one or more rejections of prior UE handover request, wherein the received handover response messages include a code indicating the access mode of the first target access node; and transmit a handover request message to the first target access node in response to an indication of the access mode from the barred neighbor data that the first target access node is available to receive the UE handover.

2. The system of claim 1, wherein a lack of the access mode appearing in the barred neighbor data for the first target access node indicates that the first target access node is available to receive the UE handover.

3. The system of claim 1, wherein the barred neighbor data includes an access node identification of the first target access node to indicate when the first target access node is not available to receive the UE handover.

4. The system of claim 1, the one or more processors further to:

identify a second target access node to receive the user equipment (UE) handover based on the measurement data, in response to an indication of the access mode from the barred neighbor data that the first target access node is in a barred access mode not available to receive the UE handover.

5. The system of claim 1, the one or more processors further to:

receive a handover response message from the first target access node in response to the handover request message; and update the barred neighbor data based on an indication from the handover response message that the first target access node is in a barred access mode and not available to receive the UE handover.

6. The system of claim 5, the one or more processors further to:

in response to the indication from the handover response message that the first target access node is in the barred access mode, identify a second target access node to receive the user equipment (UE) handover based on the measurement data from the UE.

7. The system of claim 5, the one or more processors further to:

update the barred neighbor data to include an indication of time that the barred neighbor data was updated to include the first target access node.

8. The system of claim 7, the one or more processors further to:

remove the first target base station from the barred neighbor data based on the indication of time indicating that the barred neighbor data has included the first target access node for a duration of time exceeding a specified time duration.

9. The system of claim 1, the one or more processors further to:

receive a handover response message from the first target access node in response to the handover request message; and transmit a message to the UE to initiate the UE handover based on an indication from the handover response message that the first target access node is available to receive the UE handover.

10. The system of claim 1, the one or more processors further to:

execute one or more functions of a wireless communication base station, wherein the wireless communication base station is configured to communicate with one or more UE over one or both of uplink (UL) radio frequency (RF) signals and downlink (DL) RF signals.

11. The system of claim 1, wherein the one or more processors are comprised within a radio access network of a wireless communication system.

12. A wireless communication base station system, the system comprising:

at least one controller comprising one or more processing units to execute one or more functions of a wireless communication base station, wherein the wireless communication base station is configured to communicate with one or more user equipment (UE) over one or both of uplink (UL) radio frequency (RF) signals and downlink (DL) RF signals, the one or more processing units to further execute operations comprising:

receive measurement data from a first UE of the one or more UE, the measurement data comprising one or more measurements of RF signals of one or more neighboring base stations;

identify a first target base station of the one or more neighboring base stations to receive a UE handover based at least on the measurement data;

determine an availability of the first target base station to receive the UE handover based on an access mode of the first target base station as indicated by barred neighbor data, wherein the barred neighbor data indicates the access mode of one or more access nodes as compiled based on received handover response messages from the first target base station comprising one or more rejections of prior UE handover request, wherein the received handover response messages include a code indicating the access mode of the first target base station; and transmit a handover request message to the first target base station in response to an indication of the access mode from the barred neighbor data that the first target base station is available to receive the UE handover.

13. The system of claim 12, the operations further comprising:

identify a second target base station of the one or more neighboring base stations to receive the UE handover based on the measurement data, in response to an indication of the access mode from the barred neighbor data that the first target base station is in a barred access mode not available to receive the UE handover.

14. The system of claim 12, the operations further comprising:

receive a handover response message from the first target base station in response to the handover request message;

update the barred neighbor data based on an indication from the handover response message that the first target base station is in a barred access mode and not available to receive the UE handover; and update the barred neighbor data to include an indication of time that the barred neighbor data has included the first target base station.

15. The system of claim 14, the operations further comprising:

identify a second target access node to receive the UE handover based on the measurement data from the first UE, in response to the indication from the handover response message that the first target base station is in the barred access mode.

16. The system of claim 14, the operations further comprising:

remove the first target base station from the barred neighbor data based on the indication of time indicating that the barred neighbor data has included the first target base station for a duration of time exceeding a specified time duration.

17. The system of claim 12, the operations further comprising:

receive a handover response message from the first target base station in response to the handover request message; and transmit a message to the first UE to initiate the UE handover based on an indication from the handover response message that the first target base station is available to receive the UE handover.

18. A method for user equipment (UE) handover preparation optimization, the method comprising:

identifying a first target access node to receive a UE handover based at least on measurement data received from a UE;

determining an availability of the first target access node to receive the UE handover based on an access mode of the first target access node as indicated by barred neighbor data, wherein the barred neighbor data indicates the access mode of one or more access nodes as compiled based on receiving handover response messages from the first target access node comprising one or more rejections of prior UE handover request, wherein the received handover response messages include a code indicating the access mode of the first target access node;

transmitting a handover request message to the first target access node in response to an indication of the access mode from the barred neighbor data that the first target access node is available to receive the UE handover; and identifying a second target access node to receive the user equipment (UE) handover based on the measurement data, in response to an indication of the access mode from the barred neighbor data that the first target access node is in a barred access mode not available to receive the UE handover.

19. The method of claim 18, further comprising:

receiving a handover response message from the first target access node in response to the handover request message;

updating the barred neighbor data based on an indication from the handover response message that the first target access node is in the barred access mode and not available to receive the UE handover; and identifying the second target access node to receive the user equipment (UE) handover based on the measurement data from the UE, in response to the indication from the handover response message that the first target access node is in the barred access mode.

20. The method of claim 18, further comprising:

removing the first target base station from the barred neighbor data based on an indication of time indicating that the barred neighbor data has included the first target access node for a duration of time exceeding a specified time duration.

* * * * *